(12) United States Patent
Ueda et al.

(10) Patent No.: US 6,673,738 B2
(45) Date of Patent: Jan. 6, 2004

(54) PHOTOCATALYTIC ACTIVE CARBON, COLORED PHOTOCATALYTIC ACTIVE CARBON, COLORING ACTIVE CARBON, AND DEODORANT AND ADSORPTION PRODUCT USING THEM

(75) Inventors: Toshiya Ueda, Sakai (JP); Motoyoshi Nishimura, Sakai (JP)

(73) Assignee: K.K. Ueda Shikimono Kojyo, Osaka-hu (JP)

( * ) Notice: Subject to any disclaimer, the term of this patent is extended or adjusted under 35 U.S.C. 154(b) by 0 days.

(21) Appl. No.: 10/115,549

(22) Filed: Apr. 3, 2002

(65) Prior Publication Data
US 2003/0100445 A1 May 29, 2003

(30) Foreign Application Priority Data

Nov. 28, 2001 (JP) .......................................... 2001-362930

(51) Int. Cl.⁷ .......................... B01J 21/18; B01J 23/00; B01J 20/02; C04B 14/00; C09C 1/44
(52) U.S. Cl. ........................ 502/180; 502/182; 502/183; 502/416; 502/417; 106/472; 106/474; 106/400; 106/492
(58) Field of Search ................................. 502/180, 182, 502/183, 416, 417; 106/472, 474, 400, 492

(56) References Cited

U.S. PATENT DOCUMENTS

| | | | | |
|---|---|---|---|---|
| 3,746,655 A | * | 7/1973 | Urbanic | 252/430 |
| 4,954,465 A | * | 9/1990 | Kawashima et al. | 502/5 |
| 5,965,479 A | * | 10/1999 | Suzuki et al. | 502/182 |
| 6,409,928 B1 | * | 6/2002 | Gonzalez et al. | 210/748 |
| 2002/0006865 A1 | * | 1/2002 | Morikawa et al. | 502/200 |

FOREIGN PATENT DOCUMENTS

| | | |
|---|---|---|
| JP | 10-57816 | 3/1998 |
| JP | 10-226509 | 8/1998 |
| JP | 10-286456 | 10/1998 |
| JP | 11-9993 | 1/1999 |
| JP | 11-319580 | 11/1999 |
| JP | 2000-225321 | 8/2000 |
| JP | 2000-262904 | 9/2000 |
| JP | 2000-317271 | 11/2000 |
| JP | 2001-104754 | 4/2001 |
| JP | 2001-170450 | 6/2001 |
| JP | 2001-179109 | 7/2001 |
| JP | 2001-246265 | 9/2001 |
| JP | 2001-276194 | 10/2001 |

* cited by examiner

Primary Examiner—Mark L. Bell
Assistant Examiner—Patricia L. Hailey
(74) Attorney, Agent, or Firm—Jordan and Hamburg LLP

(57) ABSTRACT

A photocatalytic active carbon capable of demonstrating a stable deodorizing and adsorbing ability for a prolonged period of time is produced by depositing a coating of a photocatalyst on the surface of the active carbon by means of vapor deposition. Colored photocatalytic active carbon coloring active carbon including the photocatalytic active carbon, which while maintaining the adsorbing action and the decomposing and sterilizing action, comes to be rich in color variations and capable of improving visual design and handling are produced by subjecting the surface of the active carbon to coloring treatment and/or treatment with a compound having coloring or discoloring properties upon hydration.

13 Claims, No Drawings

PHOTOCATALYTIC ACTIVE CARBON, COLORED PHOTOCATALYTIC ACTIVE CARBON, COLORING ACTIVE CARBON, AND DEODORANT AND ADSORPTION PRODUCT USING THEM

BACKGROUND OF THE INVENTION

1. Field of the Invention

The present invention relates to a photocatalytic active carbon capable of demonstrating a stable deodorizing and adsorbing ability for a prolonged period of time by combining the adsorbing action of active carbon with the decomposing and sterilizing action of a photocatalyst, and in particular to colored photocatalytic active carbon and coloring active carbon including the photocatalytic active carbon, which while maintaining the adsorbing action and the decomposing and sterilizing action, comes to be rich in color variations and capable of improving visual design and handling by subjecting the surface of the active carbon to coloring treatment and/or treatment with a compound having coloring or discoloring properties upon hydration, and to a deodorant and adsorption product using them.

2. Description of the Related Art

Active carbon is carbon whose ability to adsorb gas, pigments etc. has been improved by subjecting a starting material (material of active carbon) such as wood, sawdust, dry-distillated wood, charcoal, coconut shell or lignin to special treatment (activating treatment), and active carbon is the most widely used adsorbent at present in the field of deodorants and adsorption products, such as water purification, deodorants in refrigerators or shoe cupboards, filters in an air cleaners, etc. because of its low price and its high ability to adsorb odor components such as household odors, VOC gas causing sick house, such as formalin, ethyl benzene or xylene, and adsorbed components such as water.

However, the adsorption of such active carbon is nonstationary and governed by adsorption equilibrium, so that once a predetermined amount of adsorbed components and water are adsorbed, the active carbon looses its adsorption ability and comes to be in an inactivated state.

To regenerate the adsorption ability of active carbon in this inactivated state, the active carbon is subjected to heat treatment or treatment with inert gas at high temperatures in order to remove the adsorbed components and water from micropores on the surface of the active carbon.

When adsorbed components are adsorbed strongly into the micropores on the surface of the active carbon, the active carbon is heated at a high temperature of about 500 to 800° C. for several hours thereby carbonizing the adsorbed components, and in the presence of water vapor, these carbonized materials on the surface are gasified by heating at 900 to 1200° C. for several hours, whereby the active carbon is activated for regeneration.

However, these methods of regenerating active carbon are problematic because the regeneration cost is increased due to the necessity for a special regeneration furnace, and the concentration of water vapor, the activating temperature, the activating time etc. in the regeneration furnace are hardly regulated; thus causing a loss in several to several tens % of the adsorption ability every time active carbon is regenerated Accordingly, these regeneration treatment methods are not used for a deodorant or adsorption product using conventional active carbon, and in almost all cases, the whole of the deodorant or adsorption product, or the active carbon therein, is exchanged with a new one.

However, the active carbon has a relatively high adsorption ability as described above, to reach a saturated state in a short time, and therefore, the active carbon should be exchanged frequently, but this exchange is very troublesome in circumstances where it is actually used.

Further, there is the problem that the active carbon just after activating treatment cannot be visually distinguishable from the one in a saturated state, and thus the time for exchange cannot be judged with the naked eyes, and for this reason and owing to the troublesome operation of exchange, the active carbon is often left even after the time for exchange.

Further, the active carbon is black and thus inferior in design, and thus almost all deodorants or adsorption products using active carbon commercially available at present are devised such that their active carbon cannot be seen from the outside by encapsulating the active carbon in a package or box. Thus this not only makes it further difficult to judge the time of exchange with the naked eyes, but also deprives the active carbon of the opportunity thereof to contact with the air so that the good adsorption ability of the active carbon cannot be sufficiently demonstrated.

These problems seem to be solved by simply coloring the active carbon, but the surface of the active carbon is a mass of carbon onto which a hydrophilic coating is hardly applied, and even if coated with the coating, the active carbon is very poor in coloring because of its original black color, thus making achievement of various color variations is difficult.

The means of decomposing adsorbed components captured in micropores on the surface of active carbon is studied and developed very recently by mixing active carbon with a photocatalyst such as titanium dioxide or by permitting a photocatalyst to be carried via a binder such as an adhesive on the surface of active carbon.

That is, the active carbon mixed with the photocatalyst or having the photocatalyst carried thereon is studied extensively at preset because even if such active carbon reaches saturated with adsorbed components captured in the micropores on the surface of the active carbon, the active carbon can decompose the adsorbed components by the photocatalyst upon irradiation of the active carbon with sunrays or lights containing UV rays from an incandescent lamp, thus regenerating the adsorption ability of the active carbon in order to maintain and secure the adsorption action thereof for a prolonged period of time.

However, when the active carbon and photocatalyst are mixed, the photocatalyst is apart from adsorbed components on the surface of active carbon, thus lowering the action of decomposing the adsorbed components, and the photocatalyst is a powder easily scattered and inferior in handling and recovery, and the scattered photocatalyst scatters UV rays to further lower the decomposition action.

Further, the active carbon and the photocatalyst are hardly mixed because of a difference in specific gravity and particle diameter, and as a result there is the problem that qualities are varied and the desired adsorption and photocatalytic action cannot be achieved.

On the other hand, when the photocatalyst is carried via a binder such as an adhesive on the surface of active carbon, the photocatalyst is embedded in the binder, or the micropores on the surface of active carbon are covered with the binder, and as a result there is the problem that the action of the photocatalyst to decompose the adsorbed components is weakened, and the adsorbing ability of active carbon is reduced, and further there is the problem that the binder itself is subjected to the decomposition action of the photocatalyst and thus exfoliated and released from the surface of the active carbon.

Further, there is the problem that the decomposition action of the photocatalyst is directed to only the adsorbed components based on organic materials so that when water is adsorbed, there is no or less effect.

This adsorbed water can be removed by the simple treatment such as slightly heating active carbon or drying it under sunrays, but as described above, the active carbon even just after activation cannot be distinguished with the naked eyes from the one in a saturated state (i.e. the one having lost the adsorption ability), and therefore, the active carbon after saturated with water is often still left in a refrigerator.

As a result of extensive study for solving the problems described above, the present inventors found that a coating of a photocatalyst is formed and carried by means of vapor deposition on the surface of active carbon, whereby the photocatalyst can be made close to micropores on the surface of active carbon, and by means of vapor deposition without using a binder or the like, a reduction caused by imbedding, in the action of the photocatalyst to decompose adsorbed components can be prevented, and the coating of the photocatalyst is so thin that even if the micropores on the surface of active carbon is covered with the coating, the adsorption ability of active carbon is hardly deteriorated.

Further, the present inventors found that by covering the surface of active carbon with a coating of a photocatalyst, the active carbon can be easily subjected thereon to coloring treatment, whereby the active carbon can have various color variations to improve design.

The present inventors found that by using particularly $TiO_2$ as an essential ingredient in the photocatalytic coating, the surface of the active carbon after vapor deposition treatment can be made gray or white, and the coloring thereof upon coloration can thereby be significantly improved.

Further, the present inventors found that after the surface of active carbon is covered with the photocatalytic coating, a compound having coloring or discoloring properties upon hydration is carried thereon, whereby the surface of the active carbon is gradually colored or discolored depending on the amount of water adsorbed, and as a result, the time for exchange of the active carbon and the time for regeneration by drying can be easily known and the handling can thereby be improved.

SUMMARY OF THE INVENTION

The prevent invention is completed on the basis of the findings described above, and an object of the present invention is to provide a photocatalytic active carbon capable of demonstrating a stable deodorizing and adsorbing ability for a prolonged period of time by forming and carrying a coating of a photocatalyst by means of vapor deposition, and a further object is to provide colored photocatalytic active carbon and coloring active carbon including the photocatalytic active carbon, which while maintaining the adsorbing action and the decomposing and sterilizing action, comes to be rich in color variations and capable of improving visual design and handling by subjecting the surface of the active carbon to coloring treatment and/or treatment with a compound having coloring or discoloring properties upon hydration, as well as a deodorant and adsorption product using them.

To achieve the object, the photocatalytic active carbon of the present invention forms and carries a coating of a photocatalyst by means of vapor deposition on the surface of active carbon.

That is, the photocatalytic active carbon capable of exhibiting a deodorizing and adsorbing ability stably for a long time can be obtained by forming and carrying a coating of the photocatalyst on the surface of active carbon.

In the photocatalytic active carbon thus obtained, the micropores on the surface of active carbon are made close to the photocatalyst, and the photocatalyst is carried by means of vapor deposition without using a binder or the like, a reduction caused by imbedding, in the action of the photocatalyst to decompose adsorbed components can be prevented, and the coating of the photocatalyst by means of vapor deposition is so thin that even if the micropores on the surface of active carbon is covered with the coating, the adsorption ability of active carbon is hardly deteriorated.

PREFERRED EMBODIMENTS OF THE INVENTION

Hereinafter, the photocatalytic active carbon of the present invention is described in more detail.

As described above, the photocatalytic active carbon of the present invention is obtained by forming and carrying a coating of a photocatalyst by means of vapor deposition on the surface of active carbon.

The active carbon used in the photocatalytic active carbon of the invention is not particularly limited, and can make use of conventional active carbon used in industrial catalytic carriers and deodorants and recovery of organic solvents.

The materials of the active carbon are not particularly limited either, and can make use of known materials of active carbon, such as wood, sawdust, dry-distilled wood, charcoal, coconut shell and lignin, among which preferably used is a coconut shell which is easily available and inexpensive and have high absorptivity.

The photocatalytic active carbon of the present invention forms and carries a coating of a photocatalyst by means of vapor deposition on the surface of the active carbon, and the photocatalyst is not particularly limited insofar as it can bring about catalytic reaction upon light absorption to decompose adsorbed materials adsorbed on the active carbon.

In the photocatalytic reaction, light energy is added to the reaction system so that in the reaction system, there are two cases where Gibbs' free energy is decreased or increased, and generally the latter may be regarded as being different from the photocatalytic reaction, but in the photocatalytic reaction in the present invention, there is no necessity for particular discrimination between the two.

Specifically, the photocatalyst includes e.g. $TiO_2$, $ZnO$, $SrTiO_3$, $CdS$, $CdO$, $CaP$, $InP$, $In_2O_3$, $CaAs$, $BaTiO_3$, $K_2NbO_3$, $Fe_2O_3$, $Ta_2O_5$, $WO_3$, $SaO_2$, $Bi_2O_3$, $NiO$, $Cu_2O$, $SiC$, $SiO_2$, $MoS_2$, $MoS_3$, $InPb$, $RuO_2$ and $CeO_2$, and in the present invention, at least one member selected from these photocatalysts can be used.

In the present invention, the starting material of the photocatalyst carried on the surface of active carbon is not limited to the photocatalysts described above, and even a starting material not having a photocatalytic action can be used insofar as it can be converted by means of vapor deposition described later into a coating of a photocatalyst to be formed and carried on the surface of activated carbon.

The photocatalytic active carbon of the present invention carries the photocatalyst by means of vapor deposition on the surface of active carbon, but the vapor deposition means is preferably the so-called thin film-making techniques such as sputtering, glow discharge, thermal vapor deposition, chemical vapor deposition or ion plating, and in the present invention, at least one or two technique selected from the vapor deposition means can be used, among which preferably used is the thermal vapor deposition means which is easy and economical with high efficiency and a high rate of vapor deposition.

In the vapor deposition means in the present invention, the amount of the photocatalyst formed and carried on the surface of active carbon is not particularly limited, and may be suitably determined depending on the intended use, place etc., and generally the photocatalyst may be carried in an amount of 1 to 200 parts by weight relative to 100 parts by weight of active carbon.

A predetermined amount of the photocatalyst is formed and carried more preferably twice or more than once by vapor deposition in order to permit the photocatalyst to be more strongly carried on the surface of the active carbon.

In the photocatalytic active carbon of the present invention, the photocatalyst carried on the surface of the active carbon particularly preferably including $TiO_2$ as an essential ingredient.

This is because $TiO_2$ is superior as a photocatalyst in the ability to decompose adsorbed components, and further because by forming and carrying $TiO_2$ on the surface of active carbon, the surface of the active carbon turns gray or white, whereby the black image of the active carbon is eliminated, and the coloring ability of the colored photocatalytic active carbon or coloring active carbon of the present invention described later is significantly improved.

Accordingly, the photocatalytic active carbon of the present invention preferably includes $TiO_2$ as an active ingredient in the photocatalyst carried on the surface of the active carbon, and specifically the amount of $TiO_2$ is preferably 30 to 100% by weight, more preferably 50 to 100% by weight of the photocatalytic coating formed and carried on the surface of the active carbon.

Hereinafter, the colored photocatalytic active carbon of the present invention is described in more detail, but the features overlapping with those described above for the photocatalytic active carbon of the present invention are omitted in the following description.

The colored photocatalytic active carbon of the present invention is obtained by which the photocatalytic active carbon of the present invention subjected to coloring treatment.

That is, the photocatalytic active carbon of the present invention is obtained by the active carbon covered thereon with a coating of the photocatalyst, so the carbon on the surface of the active carbon is bared, and thus the surface can be easily subjected to various kinds of coloring treatment, whereby the active carbon can have various color variations to improve design.

Because the active carbon including $TiO_2$ as an essential ingredient in the photocatalytic coating is gray or white after the vapor deposition, the coloring of the active carbon upon coloration is significantly improved.

Accordingly, the coloring agent used in coloring treatment of the colored photocatalytic active carbon of the present invention is not particularly limited, and can make use of a conventional coloring agent used in aqueous coatings, oil coatings or synthetic resin coatings, and the coloration method is not particularly limited, and means such as brushing, spray coating, electrostatic coating, flow coating or dipping coating can be used.

In the colored photocatalytic active carbon of the present invention, the micropores on the surface of the active carbon can be embedded in a relatively thick coating of the coloring agent, to deteriorate the adsorption ability of the active carbon, and thus the coating of the coloring agent is preferably as thin as possible.

Accordingly, the coloring treatment in the present invention is conducted preferably by means of vapor deposition, preferably by means of vapor deposition using a dye or pigment in consideration of stability.

That is, a dye or pigment coating formed by means of vapor deposition is very thin so that even if the micropores on the surface of the active carbon are covered with said coating, the adsorption ability of the active carbon is hardly deteriorated.

A description of the vapor deposition means used herein is omitted because the same means as described above can also be preferably used.

Specifically, the dye or pigment includes e.g. various dyes and pigments, preferably pigments stable to the action of the photocatalyst.

Specifically, the pigment includes e.g. white pigments such as titanium dioxide, zinc oxide, zinc sulfide, lithopone, lead pigment, antimony oxide, zirconium oxide and zircon, extender pigments such as hydrous magnesium aluminum silicate, calcium carbonate, barium sulfate, silicate, potassium aluminosilicate and hydrated alumina, chromatic pigments such as an iron oxide pigment, lead chromate, lead molybdate, cadmium pigment, a synthetic metal oxide mixture and Prussian blue, special pigments such as zinc yellow, basic zinc chromate, strontium chromate, red lead, copper oxide (I), calcium plumbate, basic lead silicochromate, white molybdate, modified barium metaborate, zinc phosphate and pearl essence, and metal pigments, and the colored photocatalytic active carbon of the present invention can make use of at least one member selected from these pigments.

Hereinafter, the coloring active carbon of the present invention is described in detail, but a description of features overlapping with those of the photocatalytic active carbon or colored photocatalytic active carbon of the present invention is omitted.

The coloring active carbon of the present invention has the feature that a compound having coloring or discoloring properties upon hydration has been carried on the photocatalytic active carbon or colored photocatalytic active carbon of the present invention described above.

That is, the photocatalytic active carbon or colored photocatalytic active carbon of the present invention described above further carries a compound having coloring or discoloring properties upon hydration carried thereon, whereby the surface of the active carbon is gradually colored or discolored depending on the amount of water adsorbed, and as a result, the time for exchange of the active carbon and the time for regeneration by drying can be easily known, and handling can be improved.

In particular, the active carbon including $TiO_2$ as an essential ingredient in the photocatalytic coating is gray or white after the vapor deposition, and thus the compound having coloring or discoloring properties upon hydration on the active carbon is significantly improved.

The compound having coloring or discoloring properties upon hydration on the coloring active carbon of the present invention is not particularly limited insofar as it is a compound which has a property of binding with water of crystallization, water in a molecular form or an inclusion water molecule or forming a complex with a water molecule and which has coloring or discoloring properties upon binding with a water molecule.

Specifically, the compound having such properties includes e.g. $CoCl_2$ (blue compound which upon hydration, becomes red $CoCl_2.6H_2O$), $CoBr_2$ (green compound which upon hydration, becomes reddish purple $CoBr_2.6H_2O$), $CrCl_3$ (purple compound which upon hydration, becomes green $CrCl_3.6H_2O$), $CuCl_2$ (yellowish brown compound which upon hydration, becomes green $CuCl_2.2H_2O$), $FeBr_3$ (reddish brown compound which upon hydration, becomes green $FeBr_3.6H_2O$), $NiCl_2$ (yellow compound which upon hydration, becomes green $NiCl_2.6H_2O$), and $NiSO_4$ (yellow compound which upon hydration, becomes green $NiSO_4.6H_2O$).

In the coloring active carbon of the present invention, the method of carrying the compound is not particularly limited, and for example, a means such as brushing, spray coating, electrostatic coating, flow coating or dipping coating can be used.

In the coloring active carbon of the present invention, the micropores on the surface of the active carbon may be embedded in a coating of the compound, to deteriorate the adsorption ability of the active carbon, and thus the coating of the compound is preferably as thin as possible.

Accordingly, the compound in the present invention is carried particularly preferably by means of vapor deposition.

That is, a coating formed by means of vapor deposition is very thin so that even if the micropores on the surface of the active carbon are covered with the coating, the adsorption ability of the active carbon is hardly deteriorated.

A description of the vapor deposition means used herein is omitted because the same means as described above can also be preferably used.

The deodorant and adsorbent products of the present invention uses at least one member selected from the group consisting of the photocatalytic active carbon, colored photocatalytic active carbon and coloring active carbon of the present invention, and it is a product embodying the action possessed by the photocatalytic active carbon, colored photocatalytic active carbon or coloring active carbon of the present invention, and examples thereof include a deodorant adsorbing and decomposing nasty odors in a room, a toilet, a refrigerator or an automobile for a long time, and a water-purifying agent for water purification in a lavatory cistern or for preventing occurrence of bacteria.

Because the product have various color variations, it can also be applied to a paper, a film made of resin, or building materials such as shoji paper, wall paper and fusuma paper to be carried on a sheet, and the product is wide applicability as compared with conventional active carbon because the product, even if carried on the surface of interior ornaments such as interior products and household goods, does not deteriorate their design.

EXAMPLES

Hereinafter, the present invention is described in more detail by reference to the examples, which are not intended to limit the present invention.

First Example (1) An active carbon material prepared by drying a coconut shell and removing fine powders was introduced into calcinated carbon (550 to 650° C.), and then subjected to activating treatment at a temperature of 850 to 950° C. in a red-hot state in a mixed atmosphere of water vapor, a carbon dioxide gas ($CO_2$ in the combustion gas) and oxygen ($O_2$ in the combustion gas), whereby granular active carbon (CTC: 55.42%) was obtained.

(2) The resultant active carbon (100 g) was mounted on a holder arranged in a vacuum container, and heated at about 300° C. under stirring with a stirring rod arranged in the holder.

(3) On the other hand, a photocatalyst $TiO_2$ (10 g) was arranged in a stand arranged in the vacuum container, and used as the source of evaporation.

(4) Subsequently, the nitrogen gas charged in the vacuum container was sucked off with a vacuum pump so that the vacuum container was under reduced pressure, and when 0.000035 mmHg was reached, the stand was heated with a heater to evaporate titanium oxide, whereby a coating of titanium oxide was formed and carried on the surface of the activated carbon on the holder, whereby the photocatalytic active carbon A of the present invention was obtained.

The resultant photocatalytic active carbon was subjected twice and third to the operation in the steps (2) to (4) described above, to give the photocatalytic active carbons B and C of the present invention having different amounts of the photocatalyst respectively.

The resultant photocatalytic active carbons are as shown in Table 1 below.

The active carbon (referred to hereinafter as active carbon 1) used as the starting material is also shown in Table 1.

TABLE 1

| Type of photo-catalyst | Weight before vapor deposition treatment | Weight after vapor deposition treatment | Amount of photo-catalyst coating carried | CTC | Color |
| --- | --- | --- | --- | --- | --- |
| Photocatalytic active carbon A | TiO2 | 100 g | 108.7 g | 8.7 g | 53.72% | gray |
| Photocatalytic active carbon B | TiO2 | 100 g | 117.2 g | 17.2 g | 50.07% | gray to white |
| Photocatalytic active carbon C | TiO2 | 100 g | 125.4 g | 25.4 g | 43.57% | white |
| Active carbon 1 | — | — | — | — | 55.42% | black |

From the results (Table 1) in the first example, it was confirmed that the photocatalytic active carbons of the present invention hardly lose the adsorption ability even carrying the photocatalyst, maintain good adsorption ability, and have a gray to white color different from the black color of active carbon.

Second Example

Each of the photocatalytic active carbons A to C (100 g) obtained in the first example was mounted on the holder arranged in the vacuum container used in the first example.

On one hand, a pigment lead chromate (red pigment, 10 g) was mounted on the stand arranged in the vacuum container and used as the source of evaporation.

The same operation as in the first example was conducted whereby lead chromate was carried on the surface of the photocatalytic active carbons A to C, to give the colored photocatalytic active carbons D to F of the present invention.

These resultant colored photocatalytic active carbons are as shown in Table 1.

In the comparative example, conventional active carbon without carrying the photocatalyst was treated in the same manner (the product is referred to as active carbon 2).

TABLE 2

| | Type of photo-catalyst | Weight before coloring treatment | Weight after coloring treatment | Amount of inorganic pigment carried | CTC | Color |
|---|---|---|---|---|---|---|
| Colored active carbon D | TiO2 | 100 g | 108.6 g | 8.6 g | 51.43% | dark red |
| Colored active carbon E | TiO2 | 100 g | 108.4 g | 8.4 g | 48.22% | red |
| Colored active carbon F | TiO2 | 100 g | 108.5 g | 8.5 g | 46.74% | red |
| Active carbon 2 | — | 100 g | 108.4 g | 8.4 g | 53.62% | black |

From the results (Table 2) in the second example, it was confirmed that the colored photocatalytic active carbons of the present invention hardly lose the adsorption ability even carrying the pigment, maintain good adsorption ability, and have a dark red to red color as opposed to the black color of the active carbon after the vapor deposition treatment with the pigment, thus showing color variations not achieved by the conventional active carbon.

Third Example

Each of the photocatalytic active carbons A to C (100 g) obtained in the first example was mounted on the holder arranged in the vacuum container used in the first example.

On one hand, $CoCl_2$ (blue compound which upon hydration becomes red $CoCl.6H_2O$, 10 g) was mounted on the stand arranged in the vacuum container and used as the source of evaporation.

The same operation as in the first example was conducted whereby $CoCl_2$ was carried on the surface of the photocatalytic active carbons A to C, to give the coloring photocatalytic active carbons G to I of the present invention.

These resultant coloring photocatalytic active carbons are as shown in Table 1.

In the comparative example, conventional active carbon not carrying the photocatalyst was treated in the same manner (the product is referred to as active carbon 3).

TABLE 3

| Type of photo-catalyst | Weight before treatment with $CoCl_2$ | Weight after treatment with $CoCl_2$ | Amount of $CoCl_2$ carried | CTC | Color |
|---|---|---|---|---|---|
| Coloring active carbon | TiO2 | 100 g | 108.4 g | 8.4 g | 51.36% | dark blue |
| Coloring active carbon | TiO2 | 100 g | 108.6 g | 8.6 g | 48.54% | blue |
| Coloring active carbon | TiO2 | 100 g | 108.3 g | 8.3 g | 46.80% | blue |
| Active carbon | — | 100 g | 108.2 g | 8.2 g | 53.50% | black |

From the results (Table 3) in the third example, it was confirmed that the coloring active carbons of the present invention hardly lose the adsorption ability even carrying $CoCl_2$ as a compound which upon hydration turns from blue to read upon hydration, and maintain good adsorption ability and have a dark blue to blue color as opposed to the black color of the active carbon after vapor deposition treatment with the compound, thus showing color variations not achieved by the conventional active carbon.

Test on Change of Adsorption Action with Time

Then, 100 g each of the photocatalytic active carbons A to C, the colored photocatalytic active carbons D to F and coloring active carbons G to I obtained in the first to third examples was placed in a 200 ml beaker, and arranged in a company's smoking room (about 12 $m^2$).

In comparative example, 100 g conventional coconut shell active carbon was introduced into a 200 ml beaker and arranged in the company's smoking room.

As a result, the conventional coconut shell active carbon reached saturated for about 4 weeks after it was arranged, and after saturation, it exhibited no adsorption action.

On the other hand, the photocatalytic active carbons A to C, the colored photocatalytic active carbons D to F and the coloring active carbons G to I maintained the initial adsorption action for 4 weeks after they were arranged, and thereafter, they exhibited good adsorption action for 6 months.

The color of the coloring active carbons G to I was changed gradually from a blue to bluish purple color about 3 months after they were arranged, and thereafter, the color was changed via a reddish violet color to a red color about 6 months after they were arranged, and it was thus confirmed that this change of color can be used as an indicator of the time for repacking or exchange of the active carbon.

As described above, the products in the examples had a longer adsorption ability than in the comparative example, probably because odor components are photo-decomposed by the photocatalyst, and as a result, the deterioration of the adsorption ability of the active carbon is prevented and its longevity is prolonged.

According to the present invention having the constitution described above, a coating of a photocatalyst is formed and carried on the surface of active carbon by means of vapor deposition whereby micropores on the surface of the active carbon are made close to the photocatalyst, and by means of vapor deposition without using a binder or the like, a reduction and deterioration caused by imbedding, in the action of the photocatalyst to decompose adsorbed components can be prevented, and the coating of the photocatalyst is so thin that even if the micropores on the surface of active carbon is covered with the coating, the adsorption ability of active carbon is hardly deteriorated.

In the present invention, by covering the surface of active carbon with a coating of a photocatalyst, the active carbon can be easily subjected thereon to coloring treatment, whereby the active carbon can have various color variations to improve design.

In the present invention, by using particularly $TiO_2$ as an essential ingredient in the photocatalytic coating, the surface of the active carbon after vapor deposition treatment can be made gray or white, and the coloring thereof upon coloration can thereby be significantly improved.

In the present invention, after the surface of active carbon is covered with the photocatalytic coating, a compound having coloring or discoloring properties upon hydration is carried thereon, whereby the surface of the active carbon is gradually colored or discolored depending on the amount of water adsorbed, and as a result, the time for exchange of the active carbon and the time for regeneration by drying can be easily known and the handling can thereby be improved.

What is claimed is:

1. A photocatalytic active carbon comprising active carbon and a coating of a photocatalyst formed by means of vapor deposition on a surface of the active carbon and a photocatalytic active carbon having been subjected to a coloring treatment comprising directly depositing a coating of a dye or pigment on the photocatalytic active carbon by means of vapor deposition.

2. The photocatalytic active carbon according to claim 1, wherein the active carbon is produced from coconut shell.

3. The photocatalytic active carbon according to claim 1 or 2, wherein the photocatalyst is at least one member selected from the group consisting of $TiO_2$, $ZnO$, $SrTiO_3$, $CdS$, $CdO$, $CaP$, $InP$, $In_2O_3$, $CaAs$, $BaTiO_3$, $K_2NbO_3$, $Fe_2O_3$, $Ta_2O_5$, $WO_3$, $SaO_2$, $Bi_2O_3$, $NiO$, $Cu_2O$, $SiC$, $SiO_2$, $MoS_2$, $MoS_3$, $InPb$, $RuO_2$ and $CeO_2$.

4. The photocatalytic active carbon according to claim 1 or 2, wherein the coating of the photocatalyst comprises TiO2.

5. A deodorant and adsorbent product comprising a photocatalytic active carbon according to claim 1 or 2.

6. A photocatalytic active carbon according to claim 1, wherein the vapor deposition is thermal vapor deposition.

7. A coloring photocatalytic active carbon comprising a photocatalytic active carbon comprising active carbon, a coating of photocatalyst formed by means of vapor deposition on a surface of the active carbon, and a compound having coloring or discoloring properties upon hydration carried on a surface of the photocatalytic active carbon.

8. A deodorant and absorbent product comprising a coloring photocatalytic active carbon according to claim 7.

9. A coloring photocatalytic active carbon comprising a colored photocatalytic active carbon and a compound having coloring or discoloring properties upon hydration carried on a surface of the colored photocatalytic active carbon, the colored photocatalytic active carbon comprising active carbon and coating of a photocatalyst formed by means of vapor deposition on surface of the active carbon.

10. The colored photocatalytic active carbon according to claim 9, wherein the coloring treatment comprises directly depositing a coating of a dye or pigment on the photocatalytic active carbon by means of vapor deposition.

11. The colored photocatalytic active carbon according to claim 10, wherein the pigment is at least one member selected from the group consisting of a white pigment, an extender pigment, a chromatic pigment, a special pigment and a metallic pigment.

12. The colored photocatalytic active carbon according to claim 10, wherein the pigment is at least one member selected from the group consisting of titanium dioxide, zinc oxide, zinc sulfide, lithopone, a zinc pigment, antimony oxide, zirconium oxide, zircon, hydrous magnesium aluminum silicate, calcium carbonate, barium sulfate, silicate, potassium aluminosilicate, hydrated alumina, an iron oxide pigment, lead chromate, lead molybdate, a cadmium pigment, a synthetic metal oxide mixture, Prussian blue, zinc yellow, basic zinc chromate, strontium chromate, red lead, copper oxide (I), calcium plumbate, basic lead silicochromate, white molybdate, modified barium metaborate, zinc phosphate and pearl essence.

13. A deodorant and absorbent product comprising a colored photocatalytic active carbon according to claim 9.

* * * * *